United States Patent [19]

Durran

[11] 4,319,839
[45] Mar. 16, 1982

[54] BEAM ALIGNMENT SYSTEM

[75] Inventor: Donald A. Durran, Manhattan Beach, Calif.

[73] Assignee: The United States of America as represented by the Secretary of the Air Force, Washington, D.C.

[21] Appl. No.: 134,597

[22] Filed: Mar. 27, 1980

[51] Int. Cl.³ .............................................. G01B 11/27
[52] U.S. Cl. ...................... 356/153; 350/6.5; 356/400
[58] Field of Search ........ 356/138, 153, 152, 147–148, 356/399–400; 219/121 LS, 121 LU, 121 LW, 121 LM; 346/76 L; 250/202–203; 358/285, 293; 350/6.1–6.91, 171

[56] References Cited

U.S. PATENT DOCUMENTS

| | | | |
|---|---|---|---|
| 3,056,331 | 10/1962 | Sisson | 250/203 R |
| 3,154,626 | 10/1964 | Sisson | 250/203 R |
| 3,497,697 | 2/1970 | Brinkman et al. | 356/153 |
| 3,510,658 | 5/1970 | Rabedeau | 250/202 |
| 3,762,819 | 10/1973 | Myer | 356/138 |
| 3,804,485 | 4/1974 | Clarke | 350/6.2 |
| 3,851,974 | 12/1974 | Ravussin et al. | 356/153 |
| 3,892,488 | 7/1975 | Edmonds | 356/153 |
| 3,902,036 | 8/1975 | Zaleckas | 219/121 LS |
| 3,942,894 | 3/1976 | Maier | 356/153 |
| 4,146,329 | 3/1979 | Fing et al. | 356/152 |

*Primary Examiner*—William H. Punter
*Attorney, Agent, or Firm*—Donald J. Singer; Jacob N. Erlich

[57] ABSTRACT

A beam alignment system having a source for producing a first beam of electromagnetic radiation considered an alignment or reference beam, a source for producing a second beam of electromagnetic radiation to be aligned with the first beam and pair of rotating mirrors capable of being optically interposed at different times across the optical path of the first and second beams. The axes of rotation of the pair of mirrors are transverse to each other in order to enable each mirror to provide alignment information about the beams with respect to two different planes. The alignment information is indicative of a time difference between the reception by a first detector of the reflected first beam and the reflected second beam from the first mirror and a time difference between the reception by a second detector of the reflected first beam and the reflected second beam from the second mirror. These time differences are utilized to provide signals which are used to adjust the position of the source for the second beam in order to bring the second beam into alignment with the first beam in two different planes.

6 Claims, 3 Drawing Figures

BEAM ALIGNMENT SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to alignment systems, and, more particularly to a laser beam alignment system which utilizes temporal measurements in order to determine beam alignment.

In today's every increasing utilization of the laser or other collimated beams of electromagnetic radiation, precise alignment of the laser beam relative to other optical elements and fixed reference members becomes essential. Additionally, it is often necessary to continuously monitor and dynamically align such beams. For example, in laser beam pointing systems, it is also required to dynamically maintain the alignment of a collimated beam of light. Furthermore, beam alignment is critical in propagation type experiments wherein the beam of the propagating laser must be controlled spatially to a position and angle established by the beam of an alignment laser.

Heretofore, alignment systems based upon the alignment of a beam with respect to an alignment beam have relied upon positioning a detector at a point in the beam of the alignment laser and steering the beam of the other laser to that point. The presence of one beam, effectively, blanks out the other so the aiming point must not move or the original alignment is lost. If a 4-quadrant detector is used to sense the laser beam(s), it must be both precisely located and very small for good spatial resolution. Additionally, with such systems continuous reference to the alignment beam cannot be maintained. Consequently, there presently exists a need for a beam alignment system which is precise in its alignment capacity as well as capable of continuously monitoring the alignment beam so as to maintain long-time alignment stability.

SUMMARY OF THE INVENTION

The instant invention overcomes the problems encountered in the past by providing a beam alignment system which relies upon temporal measurements instead of spacial measurements in order to determine and maintain beam alignment.

The beam alignment system of this invention is made up of a pair of spaced apart mirrors, each mirror forming part of a mirror assembly capable of providing rotational movement for the mirrors about individual axes, the axes being transverse to one another. Located in optical alignment with each mirror at a preselected location with respect thereto is a conventional photodetector and its associated mask or slit. The longitudinal axis of the slit optically aligned with one mirror is positioned transverse to the longitudinal axis of the slit optically aligned with the other mirror.

The mirrors and photodetectors are so positioned with respect to each other that a pair of misaligned beams of electromagnetic radiation (one of the beams being an alignment or reference beam) striking each mirror are reflected from each mirror to the photodetector associated therewith at a different time. It is this time difference which is utilized in conjunction with a conventional feed back circuit to activate conventional driving means so as to adjust the beam source for the misaligned beam until the misaligned beam and the alignment or reference beam are coincidental (aligned) with each other.

By providing a pair of spaced apart mirrors rotating about independent axes, a two-axis or two plane alignment can be performed by this invention. For example, one mirror/photodetector combination is representative of the x-axis or first plane misalignment while the other mirror/photodetector combination is representative of the y-axis or second plane misalignment.

Appropriate conventional gearing between the pair of mirror assemblies positions the mirrors such that only one of the mirrors intercepts the pair of misaligned beams at one time. Additionally, the rotating mirror assemblies can be stopped and positioned such that the pair of beams pass unreflected by the mirrors and can be sensed as desired. Furthermore, it should be noted that the alignment system of this invention is not limited to the alignment of only two beams, but can provide appropriate alignment information on a plurality of beams by noting the position (in time) of the pulses produced by all beams and adjusting the beam sources accordingly.

It is therefore an object of this invention to provide a beam alignment system which enables substantially simultaneous measurements to be made on at least two beams of electromagnetic radiation that are to be aligned with each other and to use those measurements to align the beams.

It is another object of this invention to provide a beam alignment system which does not require a precise positioning in the initial set-up or an unusually stable mount during the period measurements are to be made.

It is still a further object of this invention to provide a beam alignment system which permits the measurement of spatial parameters in the time domain.

It is still a further object of this invention to provide a beam alignment system in which the output is presented in a convenient form for x and y control of laser optics.

It is still another object of the invention to provide a beam alignment system which is economical to produce and which utilizes conventional, currently available components that lend themselves to standard, mass producing manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE DRAWINGS

DETAILED DESCRIPTION OF THE PREFERRED EMBODIMENT

Figure 1:
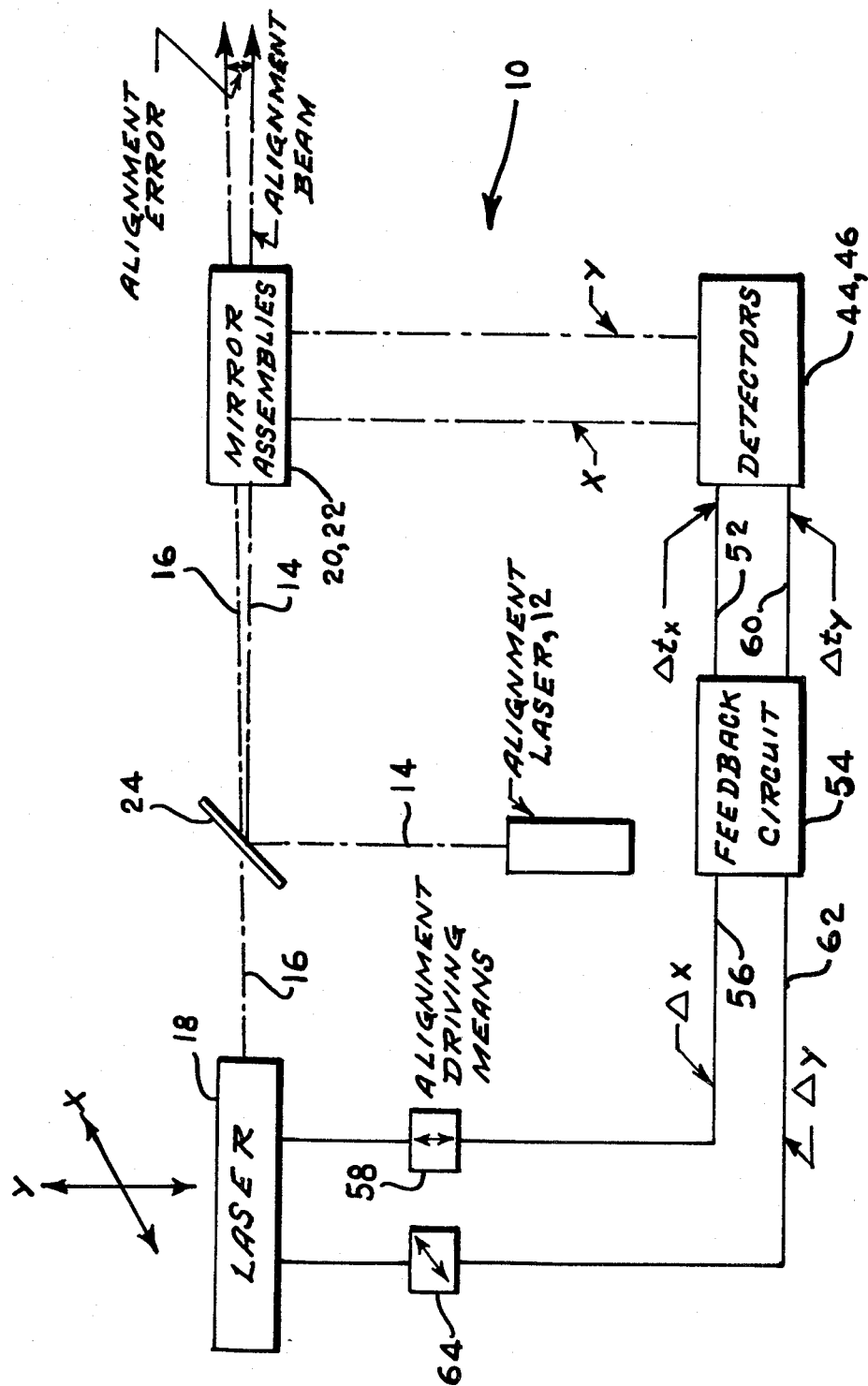
FIG. 1 is a schematic representation of the beam alignment system of this invention.

Reference is now made to FIG. 1 of the drawings which illustrates schematically the beam alignment system 10 of this invention. Beam alignment system 10 is utilized in conjunction with a first source of electromagnetic radiation in the form of, for example, a conventional laser 12 which produces an alignment or reference beam 14. A second beam 16 is provided by a second source of electromagnetic radiation in the form of, for example, another conventional laser 18. It is the object of this invention to align beam 16 with beam 14 and to maintain this alignment.

Figure 2:
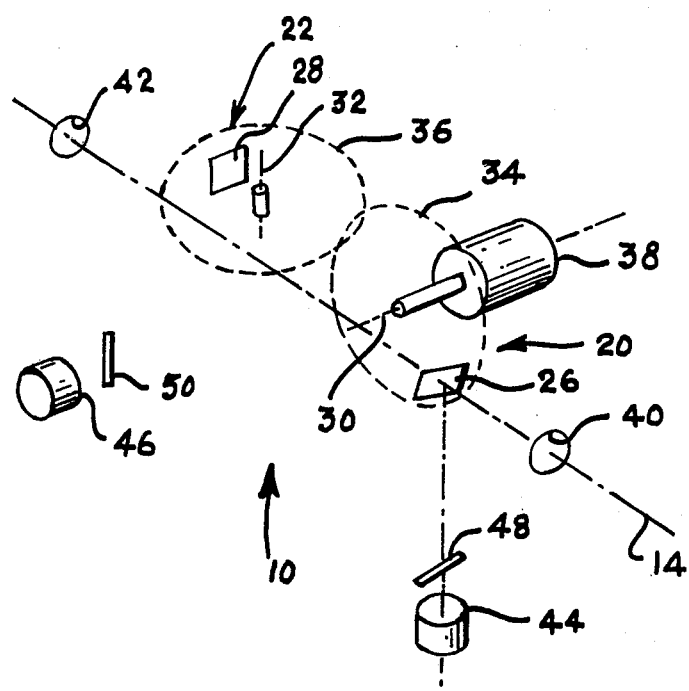
FIG. 2 is a pictorial representation of the beam alignment system of this invention illustrative of one of the positions of the mirror assemblies associated therewith.
Figure 3:
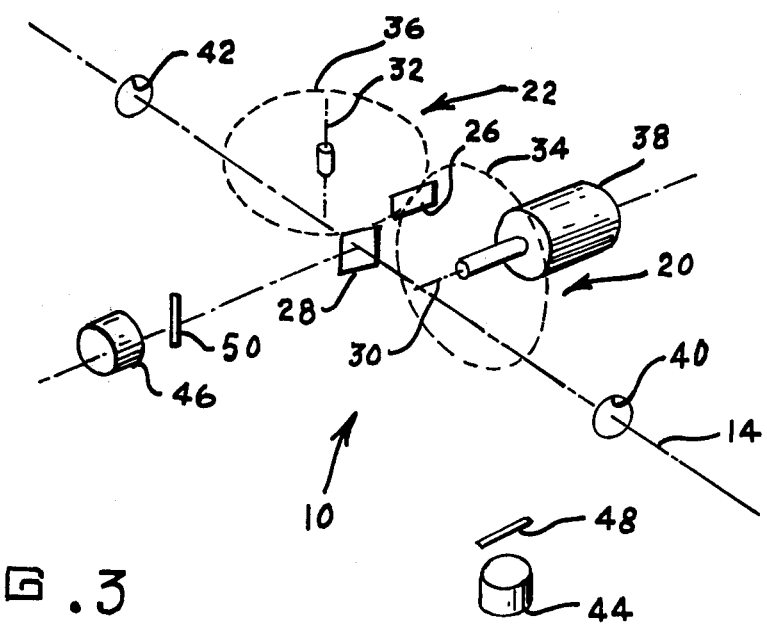
FIG. 3 is a pictorial representation of the beam alignment system of this invention illlustrative of another of the positions of the mirror assemblies associated therewith.

Beams 14 and 16, which are to be brought into optical alignment with each other by this invention, are received by a pair of mirror assemblies 20 and 22 shown in detail in FIGS. 2 and 3 of the drawings. Any conventional beam directing means such as mirror 24 can be utilized to bring alignment beam 14 into a path which is juxtaposed beam 16. In this manner both beams 14 and 16 can be optically aligned with mirror assemblies 20 and 22. It should be realized, however, that other arrangements can be utilized within the scope of this invention so as to direct beams 14 and 16 to mirror assemblies 20 and 22.

As shown in FIG. 2 of the drawings, each mirror assembly 20 and 22 incorporates therein a reflective element in the form of cylindrically-shaped or more conventionally referred to convex mirrors 26 and 28, respectively. Each convex mirror 26 and 28 rotates about independent axes 30 and 32, respectively, which are positioned transverse to each other.

The synchronous rotational movement of mirrors 26 and 28 is accomplished by means of helical gearing arrangements 34 and 36 forming part of mirror assemblies 20 and 22, respectively, and shown schematically in FIG. 2 of the drawings. Although the helical gearing arrangements 34 and 36 are an effective manner of providing synchronous rotation of mirrors 26 and 28, rotation may be provided by any other suitable gearing arrangement within the scope of this invention. Any conventional driving means such as illustrated by motor 38 is connected to one of the mirror assemblies 20 so as to simultaneously rotate mirrors 26 and 28 at a preselected speed. In addition, for proper operation of this invention mirrors 26 and 28 are spaced on mirror assemblies 20 and 22, respectively, out of phase with each other such that mirrors 26 and 28 do not intercept the path of beams 14 and 16 simultaneously. As a result of this arrangement the path of beams 14 and 16 is generally unoccluded by mirrors 26 and 28 as the beams pass through alignment system 10; with measurements being made only during the intersection of the beam path by respective mirrors 26 and 28.

An entrance aperture 40 and an exit aperture 42 provide an inlet and outlet for beams 14 and 16 as well as defining their optical path. The apertures 40 and 42 are so positioned so as to enable mirrors 26 and 28 to intersect the optical path of beams 14 and 16 at preselected positions along the path in a manner described in detail hereinbelow.

Additionally, optically aligned with each mirror 26 and 28 adjacent the heretofore defined preselected positions along the optical path of beams 14 and 16 (as illustrated in FIGS. 2 and 3 of the drawings) are a first detector 44 and a second detector 46. Each detector 44 and 46 may be in the form of any conventional photodetector and has a respective mask or slit 48 and 50 aligned therewith. For proper sensing of beams 14 and 16 slits 48 and 50 have their longitudinal axes in a direction transverse to each other.

As shown in FIGS. 2 and 3 of the drawings, it is preferred that mirrors 26 and 28 be so positioned that as one mirror 26, for example, intersects beams 14 and 16, the other mirror 28 is out of the intersecting position. As illustrated in FIG. 3 of the drawings when mirror 28 intersects beams 14 and 16, mirror 26 is out of the intersecting position. For simplicity, only input beam 14 is shown in FIGS. 2 and 3 of the drawings. It should be realized, however, that in actuality, both beams 14 and 16 simultaneously pass through input aperture 40 and are intersected by mirrors 26 and 28.

Again referring to FIG. 2 of the drawings, alignment beam 14 enters aperture 40 and strikes rotating convex mirror 26 as mirror 26 crosses its optical path. Continued rotational movement of mirror 26 sweeps reflected beam 14 across the small slit 48 and into photodetector 44. By making the rotating mirror 26 with a cylindrical or convex optical configuration, beam 14 can be focused on slit 48 so the output of detector 44 will record a sharp pulse the instant the reflected beam crosses slit 48.

The other beam 16 (not shown in FIG. 2 of the drawings) which is displaced or angled to alignment beam 14, as shown in FIG. 1 of the drawings, is also reflected and swept by mirror 26 across slit 48 to photodetector 44. However, since beam 16 is displaced or angled from alignment beam 14, reflected beam 16 will be swept across slit 48 at a different time than beam 14. Beam 16 produces another sharp pulse which will appear on detector 44 at a different time than beam 14 because rotating mirror 26 will be in a different position when reflected beam 16 passes across slit 48.

Referring once again to FIG. 1 of the drawings an error signal 52 can now be generated by detector 44 representative of the time difference between the pulses received by detector 44 from reflected beams 14 and 16 striking detector 44. This time difference, signal 52, is designated by $\Delta t_x$ and can be fed into a conventional feed back circuit 54 which produces a signal 56 representative of the misalignment $\Delta x$ of beams 14 and 16. Signal 56 is utilized in a conventional manner to actuate any suitable driving means such as motor 58 operably connected to laser 18 in order to adjust laser 18 until the time difference $\Delta t_x$ between the pulses generated by beams 14 and 16 is zero. Thus, alignment in the x-direction or in a first plane is accomplished.

The other mirror 28 is positioned behind the first mirror 26 with its axis 32 of rotation being a right angles or transverse to axis 30 of mirror 26. Since both mirrors are displaced from one another; that is, do not intercept the beam path at the same time and are rotated at the same speed by the helical gearing arrangements 34 and 36 and common motor 38, the rotational position of second mirror 28 is such that it reflects beams 14 and 16 when the first mirror 26 is out of the reflecting position (as shown in FIG. 3 of the drawings).

As with mirror 26, mirror 28 as shown in FIG. 3 of the drawings, sweeps reflected beams 14 and 16 across slit 50 to photodetector 46. Since the optics of mirrors 26 and 28 are at right angles to each other the position of beams 14 and 16 in another plane (y-direction), perpendicular to the first plane, is determined. As with the operation described above, a time difference between the reception of beams 14 and 16 in the y direction is sensed by detector 46. Detector 46 produces (as shown in FIG. 1 of the drawings) a signal 60 indicative of this time difference and designated as $\Delta t_y$. Signal 60 is fed into feed back circuit 54 which produces a signal 62 indicative of the misalignment of beams 14 and 16 in the y direction and designated as $\Delta y$. Signal 62 is utilized in a conventional manner to drive any suitable driving means such as motor 64 associated with laser 18 and thereby align laser 18 in the y direction or in a second plane.

Consequently, the beam alignment system 10 of this invention provides alignment of beams 14 and 16 in two planes. The two planes are alternately scanned so the error signals, $\Delta t_x$ and $\Delta t_y$, for the position of beams 14 and 16 in each direction x and y can be generated and used to provide x and y adjustment of laser 18.

In addition, the rotating mirror assemblies 20 and 22 can be stopped at any time so that beams 14 and 16 can pass through the system without being intersected by mirrors 26 and 28. Since the photodetectors 44 and 46 have sensitive areas which are large in the axial direction perpendicular to the scanning plane as provided by slits 48 and 50 initial beam alignment is not critical. Furthermore, it is possible to use the beam alignment system 10 of this invention in order to align more that two beams by noting the position (in time) of all the pulses produced.

Although this invention, has been described with reference to a particular embodiment, it will be understood to those skilled in the art that this invention is also capable of further and other embodiments within the spirit and scope of the appended claims.

I claim:

1. A beam alignment system comprising a first reflective element, means for rotating said first reflective element about a first axis, a second reflective element, means for rotating said second reflective element about a second axis, said first axis and said second axis being positioned at right angles to each other, said first reflective element being rotatable through a first preselected position at a first preselected time so as to intercept the optical path of a first beam of electromagnetic radiation and a second beam of electromagnetic radiation to be aligned with said first beam, said first reflective element reflecting said first and second beams therefrom, said second reflective element being rotatable through a second preselected position at a second preselected time so as to intercept the optical path of said first beam and said second beam, said second reflective element reflecting said first and said second beams therefrom, said first and said second reflecting means being so positioned with respect to each other so as to intersect optical path of said first and said second beams at different times and wherein said optical path of said first and second beams is generally unoccluded as said beams pass through said system except during said first preselected time and said second preselected time, first means optically aligned with said first reflective element for detecting said first and said second beams reflected from said first reflective element and producing a first signal in response thereto, said first signal being indicative of a time interval between the reception by said first detecting means of said first reflected beam and said second reflected beam, whereby said first signal is representative of any misalignment between said first beam and said second beam in a first plane, second means optically aligned with said second reflective element for detecting said first and said second beams reflected from said second reflective element and producing a second signal in response thereto, said second signal being indicative of a time interval between the reception by said second detecting means of said first reflected beam and said second reflected beam, whereby said second signal is representative of any misalignment between said first beam and said second beam in a second plane.

2. A beam alignment system as defined in claim 1 wherein said first detecting means comprises a photodetector and a slit optically aligned therewith, said slit of said first photodetector being aligned along a first longitudinal axis, and said second detecting means comprising a photodetector and a slit optically aligned therewith, said slit of said second photodetector being aligned along a second longitudinal axis, said first and second longitudinal axes being transverse to one another.

3. A beam alignment system as defined in claim 1 wherein said first reflective element is part of a first reflector assembly and said second reflective element is part of a second reflective assembly, said first and second reflective assemblies being operably connected together in order to provide synchronous rotation of said first and said second reflective elements.

4. A beam alignment system comprising means for producing a first beam of electromagnetic radiation, means for producing a second beam of electromagnetic radiation to be aligned with said first beam, means in optical alignment with said first beam and said second beam for receiving said first and said second beams and providing a first signal indicative of a time interval between reception of said first beam and said second beam in a first plane and a second signal indicative of a time interval between reception of said first beam and said second beam in a second plane, said receiving and signal providing means including a first reflective element, means for rotating said first reflective element about a first axis, a second reflective element, means for rotating said second reflective element about a second axis, said first axis and said second axis being positioned at right angles to each other, said first reflective element being rotatable through a first preselected position at a first preselected time so as to intercept the optical path of said first beam and said second beam, said first reflective element reflecting said first and said second beams therefrom, said second reflective element being rotatable through a second preselected position at a second preselected time so as to intercept the optical path of said first beam and said second beam, said second reflective element reflecting said first and said second beams therefrom, said first and said second reflecting elements being so positioned with respect to each other so as to intersect said optical path of said first and said second beams at different times and wherein said optical path of said first and second beams is generally unoccluded as said beams pass through said system except during said first preselected time and said second preselected time, first means optically aligned with said first reflective element for detecting said first and said second reflected beams and producing said first signal in response thereto, second means optically aligned with said second reflective element for detecting said first and said second beams reflected therefrom and producing said second signal in response thereto whereby said first signal is representative of a misalignment between said first beam and said second beam in said first plane, and said second signal is representative of a misalignment between said first beam and said second beam in said second plane, means connected to said means for producing said second beam for adjusting the position of said second beam producing means in said first plane and said second plane, and means operably connected between said adjusting means and said receiving and signal providing means for transferring said first and said second signals to said adjusting means whereby said adjusting means adjusts the position of said second beam producing means in accordance therewith in order to provide alignment between said first beam and said second beam.

5. A beam alignment system as defined in claim 4 wherein said first detecting means comprises a photodetector and a slit optically aligned therewith, said slit of said first photodetector being aligned along a first longitudinal axis, and said second detecting means comprises a photodetector and a slit optically aligned therewith, said slit of said second photodetector being aligned along a second longitudinal axis, said first and second longitudinal axes being transverse to one another.

6. A beam alignment system as defined in claim 4 wherein said first reflective element is part of a first reflector assembly and said second reflective element is part of a second reflective assembly, said first and second reflective assemblies being operably connected together in order to provide synchronous rotation of said first and second reflective elements.

* * * * *